United States Patent
Zhang et al.

(10) Patent No.: US 7,447,337 B2
(45) Date of Patent: Nov. 4, 2008

(54) VIDEO CONTENT UNDERSTANDING THROUGH REAL TIME VIDEO MOTION ANALYSIS

(75) Inventors: Tong Zhang, San Jose, CA (US); Yong Wang, New York, NY (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 617 days.

(21) Appl. No.: 10/972,003

(22) Filed: Oct. 25, 2004

(65) Prior Publication Data

US 2006/0088191 A1   Apr. 27, 2006

(51) Int. Cl.
*G06K 9/00* (2006.01)
*H04N 5/14* (2006.01)
*H04B 1/66* (2006.01)

(52) U.S. Cl. .................. 382/107; 348/699; 375/240.16
(58) Field of Classification Search ................. 382/103, 382/107, 23, 240; 375/240.1, 240.16, 240.26, 375/240.29, 240.22, 240.01; 348/14.1, 69, 348/97, 154, 155, 239, 460, 471, 699, 700
See application file for complete search history.

(56) References Cited

U.S. PATENT DOCUMENTS

| | | | |
|---|---|---|---|
| 6,330,356 B1 * | 12/2001 | Sundareswaran et al. | ... 382/154 |
| 6,643,387 B1 * | 11/2003 | Sethuraman et al. | ........ 382/107 |
| 6,735,253 B1 * | 5/2004 | Chang et al. | ........... 375/240.16 |
| 6,983,018 B1 * | 1/2006 | Lin et al. | ............... 375/240.16 |
| 7,042,943 B2 * | 5/2006 | Haskell et al. | ......... 375/240.03 |

FOREIGN PATENT DOCUMENTS

WO   WO 01/45421   6/2001

OTHER PUBLICATIONS

Araki S, et al—"Real-time Tracking of Multiple Moving Object Contours in a Moving Camera Image Sequence"—IEICE Transactions on Information and Systems—Jul. 2000.
Dong K, et al—"Active Object Tracking Using Image Mosaic Background"—Proc of the Int'l Technology Conference on Circuits/Systems—Jul. 2003—pp. 1178-1181.
Jiang-Bin, Z et al—"An Algorithm for Video Monitoring Under a Slow Moving Background"—Proc Int'l Conference on machine Learning and Cybernetics-Nov. 2000 pp. 1626-1629.
Jong R K et al—"Automatic Localization and Tracking of Moving Objects Using Adaptive Snake Algorithm"—Proc Int'l Conference Multimedia Information—Dec. 2003.
Meng J et al—"CVEPS—A Compressed Video Editing and Parsing System"—Proc of ACM Multimedia—Nov. 1996—pp. 43-53.

* cited by examiner

*Primary Examiner*—Abolfazl Tabatabai

(57) ABSTRACT

Methods and integrated systems for camera motion analysis and moving object analysis and methods of extracting semantics mainly from camera motion parameters in videos and video segments without shot changes are described. Typical examples of such videos are a home video taken by a digital camera and a segment, or clip, of a professional video or film. The extracted semantics can be directly used in a number of video/image understanding and management applications, such as annotation, browsing, editing, frame enhancement, key-frame extraction, panorama generation, printing, retrieval, summarization. Automatic methods of detecting and tracking moving objects that do not rely on a priori knowledge of the objects are also described. The methods can be executed in real time.

29 Claims, 8 Drawing Sheets

| | | |
|---|---|---|
| Frame# 18 | Time # 0.70s | — ( 1.00 0.000 -0.02 -0.05 ) |
| Frame# 19 | Time # 0.73s | — ( 1.00 0.000 0.00 -0.00 ) |
| Frame# 20 | Time # 0.77s | — ( 1.00 0.002 0.07 -0.13 ) |
| Frame# 21 | Time # 0.80s | — ( 1.00 0.002 0.09 -0.14 ) |
| Frame# 22 | Time # 0.83s | — ( 1.00 0.002 0.07 -0.11 ) |
| Frame# 23 | Time # 0.87s | — ( 1.00 0.001 0.11 -0.07 ) |
| Frame# 24 | Time # 0.90s | — ( 1.00 0.000 -0.00 -0.00 ) |
| Frame# 25 | Time # 0.93s | — ( 1.00 0.000 -0.00 -0.00 ) |
| Frame# 26 | Time # 0.97s | — ( 1.00 -0.000 0.00 0.00 ) |
| Frame# 27 | Time # 1.00s | — ( 1.00 0.000 0.00 -0.00 ) |
| Frame# 28 | Time # 1.03s | — ( 1.00 -0.001 0.02 0.06 ) |

From Time 0.70s, Camera Motion Is: Focus

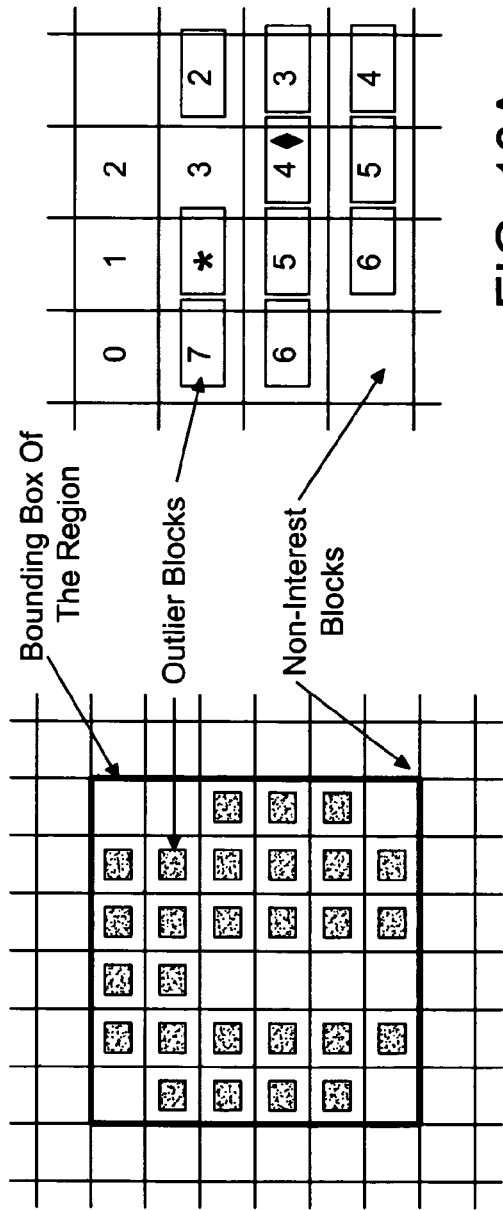
FIG. 10A
FIG. 10B
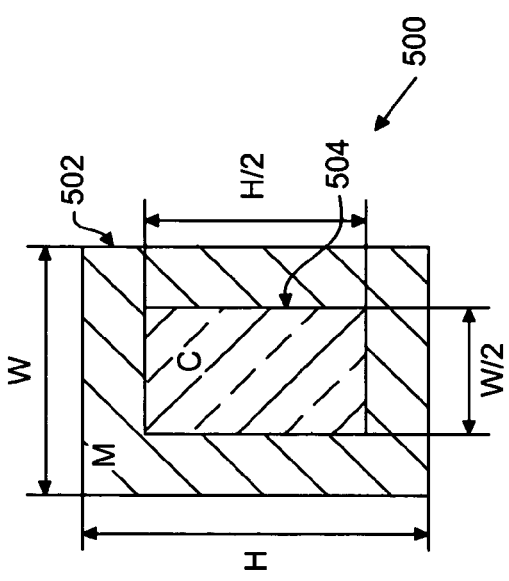
FIG. 12

VIDEO CONTENT UNDERSTANDING THROUGH REAL TIME VIDEO MOTION ANALYSIS

BACKGROUND

Video motion analysis, including camera motion analysis and object motion analysis, is an important part of understanding video content, and content understanding plays a significant role in video browsing, retrieval, editing, printing, etc., in many multimedia systems, including personal computers (PCs), digital entertainment systems, cameras, and even printers.

Currently, printers are good at representing planar (two-dimensional) media content such as documents and images, but video printing is still a labor-intensive problem because, as three-dimensional (3-D) signals (i.e., two spatial dimensions and one temporal dimension), videos contain much more information with huge amounts of redundancy, which cannot be easily represented by a static medium such as paper.

One way of video printing is to select key frames from a video clip and to print the selected frames. Unfortunately, the key-frame-extraction task is not trivial to automate because selecting key frames to maximize semantic meaning is a difficult computer vision and artificial intelligence problem. Solutions are constrained because it is usually acceptable to print only a reasonable number of key frames. Key frames may be extracted by analyzing low-level content features, such as color, texture, motion, etc.

Existing approaches to motion analysis and content understanding are either not general enough for all types of video (e.g., home video and professional video, short video clips and long video recordings, etc.) or too slow for common processing systems like PCs and embedded systems like cameras. Existing approaches are typically designed for specific tasks, e.g., tracking the movement of a person (with a known-face model) or a car (with a pre-defined car model), and have corresponding simplifications and limited applicability.

SUMMARY

In one aspect, the invention is a method of estimating camera motion between a pair of successive images including determining motion vectors from the pair of successive images and estimating an affine model of the camera's motion based on the motion vectors. Motion vector determination includes segmenting one of the pair of successive images into a plurality of blocks of pixels; selecting blocks corresponding to at least one feature in the image; determining luminance values corresponding to respective selected blocks; matching the selected blocks to blocks of pixels in the other of the pair of successive images based on the luminance values; and determining motion vectors associated with matched blocks in the pair of successive images. The estimated affine model determines a set of camera motion parameters.

In another aspect of the invention, a method of transforming camera motion parameters into semantic meanings includes determining motion vectors from pairs of successive images captured by the camera; determining respective sets of camera motion parameters by estimating affine models based on the motion vectors; and generating semantic meanings from the sets of camera motion parameters. Semantic meanings are generated by quantizing the sets of camera motion parameters into a plurality of magnitudes and directions; and generating at least one sentence from the quantized sets by identifying successive sets of camera motion parameters that are quantized into substantially the same magnitude and direction.

In a further aspect of the invention, a method of detecting an object in images captured by a camera includes determining motion vectors from pairs of successive images; estimating affine models based on the motion vectors; computing residual errors for respective blocks of pixels in the pairs of successive images from the motion vectors and the affine model estimates; and detecting an object based on the residual errors.

In a still further aspect of the invention, an apparatus for video motion understanding includes a camera motion estimator that includes an optical flow analyzer that uses luminance images for optical flow analysis to generate motion vectors from blocks of pixels in pairs of successive images, and an affine model estimator that generates affine model estimates based on the motion vectors; and an object detector that determines residual errors of blocks based on the affine model estimates, eliminates outlier blocks based on the residual errors, and filters remaining blocks, wherein the object detector generates a bounding box that identifies a size and position of an object.

BRIEF DESCRIPTION OF THE DRAWINGS

The accompanying drawings, which are incorporated in and constitute a part of the specification, illustrate embodiments of the invention and, together with the description, explain the invention. In the drawings.

FIG. 10A illustrates an embodiment of a fast flooding algorithm;

FIG. 10B illustrates a bounding box;

FIG. 12 depicts an object region divided into a marginal part and a central part.

DETAILED DESCRIPTION

Figure 1:
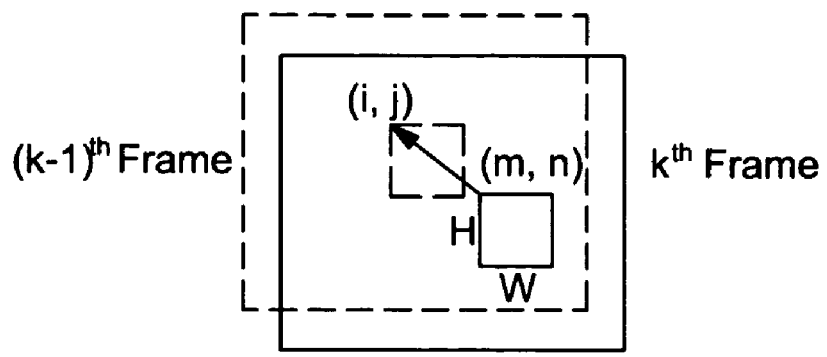
FIG. 1 illustrates an embodiment of block matching for motion estimation.

The following description of implementations consistent with the present invention refers to the accompanying drawings. The same reference numbers in different drawings identify the same or similar elements. The following detailed description does not limit the invention. Instead, the scope of the invention is defined by the appended claims.

Integrated systems for camera motion analysis and moving object analysis and methods of extracting semantics mainly from camera motion parameters in videos and video segments without shot changes is described. Typical examples of such videos are a home video taken by a digital camera and a segment, or clip, of a professional video or film. The extracted semantics can be directly used in a number of video/image understanding and management applications, such as annotation, browsing, editing, frame enhancement, key-frame extraction, panorama generation, printing, retrieval, summarization. Also described is a completely automatic method of detecting a moving object that does not rely on a priori knowledge of the object. Moreover, measures are described to speed up processing so that the methods can be executed in real time.

Real-time video semantics analysis according to one embodiment of the present invention uses motion information for understanding video content based on knowledge of computer vision and statistical pattern recognition. In general, one kind of analysis includes at least two parts: global/camera motion estimation, and foreground/object motion analysis. Camera motion estimation involves optical flow analysis, camera motion estimation, and semantic meaning extraction that implements camera motion quantization, sentence generation and paragraph generation. Camera motion estimation transforms an affine model representation of camera motion into a semantic representation. Object motion analysis involves object detection and tracking without a priori knowledge of the object. For fast and robust implementation, camera motion estimation may include accelerated block selection and block matching, and object tracking may use a spatial information enhanced color histogram.

Thus, an input sequence of frames, or images, is effectively divided into chunks based on camera motion analysis, and the chunks may be indexed in a convenient way, e.g., from 0.1 second to 2.0 second, the camera had a fast zooming-in motion; from 2.0 second to 5.0 second, the camera focus was fixed; and so on. Then, an object(s) in the chunk(s) is detected, and the object's motion is tracked, so that each video frame is further indexed by parameters, e.g., the position and size, of the moving object. In contrast to prior systems and methods, the systems and methods of the present invention can operate in real-time with readily available processors.

Camera Motion Estimation

Camera (global) motion refers to the motion induced by camera operations such as zooming, panning, and rotation. Physical camera motion is usually a moderate and time-continuous change between two successive frames. Its effect can be observed as frame-wide well-regulated optical flow change following the affine transformation defined by the camera motion. In real video, this situation is somewhat impaired by the foreground motion and other signal noises. Camera motion estimation discovers the camera motion's affine model based on the observed noisy optical flow activities. In general, this includes optical flow analysis and affine model estimation.

Optical Flow Analysis

Optical flow analysis involves the determination of frame-to-frame motion vectors, or motion estimation. The basic method for motion estimation is block matching. As depicted in FIG. 1, the intensity difference between a block at position (m, n) with pixel dimensions (W, H) in the k-th frame and the block shifted by a motion vector (i, j) in the (k−1)-th frame can be denoted by:

$$E_{k,m,n}(i,j) = \frac{1}{W \cdot H} \sum_{x_1=m}^{W+m} \sum_{x_2=n}^{H+n} e(I_k(x_1, x_2), I_{k-1}(x_1+i, x_2+j)) \quad \text{Eq. 1}$$

where I is usually the luminance of a pixel. The error metric E(i, j) can be the sum of squared errors $e(I_k, I_{k-1})$ or the sum of absolute errors $e(I_k, I_{k-1})$, with the latter having less computational cost. The motion vector associated with a block is considered to be the vector that yields the minimum distortion V within a search range (M, N) according to the following expression:

$$V(k, m, n) = \underset{i,j}{\mathrm{argmin}}\{E_{k,m,n}(i,j)\}, \quad 0 \le |i| \le M, 0 \le |j| \le N \quad \text{Eq. 2}$$

A convenient search range is M=N=8, although other search ranges, e.g., M=N=16 can be used. Motion vector determination based on 8×8 blocks or arrays of pixels is a feature of many common video encoding algorithms, including MPEG-2, MPEG-4, and Windows Media. Indeed, motion vectors generated by these and other encoding algorithms can be used with other features of the camera motion estimation and object motion analysis described below. Nevertheless, it will be appreciated that motion vector determination in a compression algorithm like MPEG-2 is intended to optimize the compression without noticeable distortion rather than to determine camera motion.

In one embodiment, to find the motion vector given by Eq. 2 an exhaustive search within the search range can be performed and can provide a global optimization. Such a search may be too computationally intensive to be done in real time, depending on the processor. Hence, in another embodiment, instead of an exhaustive search, a fast search algorithm can be used, such as a two-dimensional (2-D) log search method that is described in J. R. Jain et al., "Displacement Measurement and Its Application in Interframe Image Coding", *IEEE Trans. on Communications* vol. COM-29, pp. 1799-1808 (December 1981), a diamond search method that is described in J. Y. Tham et al., "A Novel Unrestricted Center-Biased Diamond Search Algorithm for Block Motion Estimation", *IEEE Trans. on Circuits and Systems for Video Technology* vol. 8, pp. 369-377 (August 1998), and other known search methods. Many fast search algorithms are based on the assumption that the distortion V in the search range is a monotonic convex surface with small local minima.

Figure 2:
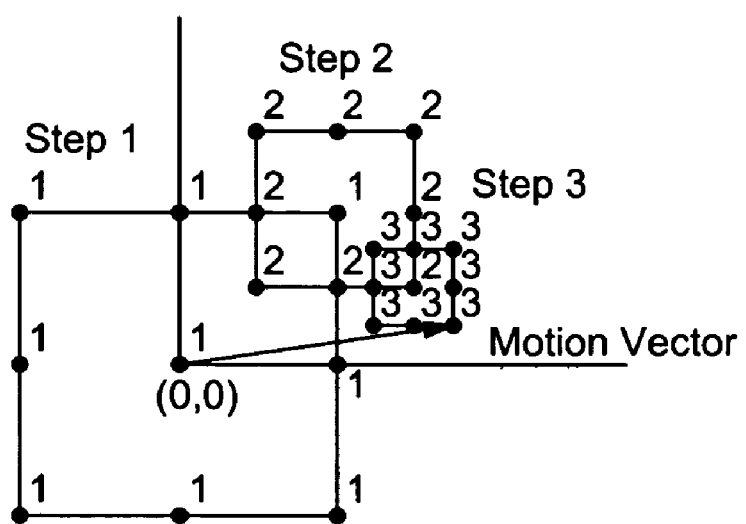
FIG. 2 illustrates an embodiment of a three-step search algorithm.

In another embodiment, a fast three-step search algorithm as described in T. Koga et al., "Motion-Compensated Interframe Coding for Video Conferencing", *Proc. Nat'l Telecommunications Conf.* pp. G5.3.1 -G5.3.5, New Orleans, La. (December 1981), can be used which may balance speed and semantic accuracy. The three-step search algorithm is illustrated by FIG. 2. Let the search range be −8 to +8. In the first step, a 16×16-pixel window having nine vertex points (indicated by the numeral 1, for step 1) is searched in one of a pair of successive frames. As depicted in FIG. 2, let the first window be centered at an origin point in the other of the pair of successive frames. Nine distortion values according to Eq. 2 are computed at the nine vertex points. In the example, the upper right one of the nine vertex points yields the minimum of the nine distortion values computed in the first step. In the second step, a 5×5 window centered at the vertex point identified by the first step as giving the minimum cost function is checked. Thus, nine more distortion values are computed at the nine vertex points (indicated by the numeral 2) of the 5×5 window. In the example, the lower right one of the nine vertex points yields the minimum of the nine distortion values computed in the second step. In the third step, a 3×3 window centered at the point identified by the second step as giving the minimum cost is checked. Thus, nine more distortion values are computed at the nine vertex points (indicated by the numeral 3) of the 3×3 window. The minimum of the nine distortion values associated with the 3×3 window (the lower-right point, in this example) yields the final motion vector.

Motion vector determination based on the minimum distortion of Eq. 2 works well for the purpose of video coding. However, this motion vector determination technique may provide erroneous results due to random noise, which affected the very small variance of the distortion distribution across a search range. Such small variances may occur for blocks in uniform portions of frames, e.g., cloudless sky. Hence, in one embodiment of the present invention, motion vectors are "filtered" by determining motion vectors for a plurality of blocks across an image and then removing outliers. In this application, an outlier is a block having a motion vector that is substantially different from a consensus of the motion vectors of the rest or a set of the plurality of blocks in the frame. The consensus is advantageously determined from affine model estimation, which is described in more detail below, and is obtained based on the variance among the errors between predicted motion vectors using an affine model and actual motion vectors. The outlier blocks are those with motion vector prediction error larger than a threshold, which may be set to a value such as one standard deviation.

In general, outliers fall into two categories: outliers due to object motion and outliers due to mismatched blocks. Outliers due to object motion, carry information useful for object detection. For instance, in a scene including a river shoreline in the foreground, a boat on the river, and the river's other shoreline in the background, the boat (i.e., object) has its own motion that is different from the camera motion. In another example in which outliers are due to mismatched-blocks, a scene including a man wearing a hat in the foreground and a building having diagonal sidings in the background, blocks located on the building's walls have simple region textures, and consequently they yield a distortion distribution variance in the search range that is small, which yields motion vectors that are more subject to noise. Other reasons for outliers include sudden luminance changes, a limited search range compared to camera motion magnitude, and local minima from fast search approaches.

Outliers can affect affine model estimation, so it is advantageous to reduce the number of outlier blocks and motion vectors by filtering as described above. Another way to reduce the number of outliers is by selecting blocks for matching computations rather than simply using all blocks that may be arbitrarily segmented from an image. One way to select blocks for matching is feature selection, which can efficiently reduce the number of outliers and the amount of block-matching calculations (motion vector determination). Only blocks associated with or corresponding to a feature or features selected in an image need be used for block matching, which can be advantageous, of course, for real-time applications.

It will be understood that an image or a video frame includes a set of objects, such as the sky, a boat, buildings, a person, etc. An object may be still or moving, and objects may be of different colors, textures, shapes, and so on. A feature of a signal or image or video frame is typically something computed from the signal/image/frame and represents an aspect of the characteristics of the data. For example, a color histogram and a color layout are two kinds of color features of an image or video frame, as they are derived from the color of the image. Instead of using all blocks in a frame for motion estimation, a feature-based selection approach may be taken, i.e., to select blocks based on one or more features of the image. These features can be color features, texture features, edge features, etc.

Feature selection may generally be either pixel-based or block-based. The former selects a feature based on pixel-wise estimation, which may involve either the KLT transform or the Moravec operator. Block-based feature selection selects a feature based on characteristics of a whole block, and may involve temporal texture analysis or discrete cosine transform (DCT) energy statistics.

One type of block-based feature selection method uses edge detection for selecting blocks in an image. There are many edge detection methods, such as the Sobel, Laplace, and Canny algorithms, and these methods have different complexities and edge qualities. In general edge detection is performed by computing an edge map of an input image, which is one feature of the image, and the edge map is used as the feature for selecting blocks, i.e., only those blocks containing enough edges are selected.

A particular example of an edge-based feature selection method uses the following two 3×3 1-D Sobel directional operators:

$$y = \begin{bmatrix} -1 & -2 & -1 \\ 0 & 0 & 0 \\ 1 & 2 & 1 \end{bmatrix} \quad x = \begin{bmatrix} -1 & 0 & 1 \\ -2 & 0 & 2 \\ -1 & 0 & 1 \end{bmatrix}$$

The operators are applied to blocks of pixel luminance values, and the sum of absolute values of the results can be used to extract edge information. In one embodiment, only those blocks exposing a certain number of edge pixels are selected during motion compensation.

The decision threshold for selected blocks may be advantageously dynamically adjusted according to the statistical distribution of the image's gradient magnitude. Canny edge detection, for example, involves two thresholds (one higher and one lower) that can affect the final result of detected edges. These thresholds can be determined using the statistical data of the gradient magnitude.

Besides identifying and eliminating outliers, it can be advantageous to take additional measures to reduce computational cost further and to increase speed, enabling real-time performance by less-capable processors. These additional measures include image resolution down-sampling, block selection down-sampling, and halfway termination, and just as eliminating outliers is effectively filtering, these additional measures can also be considered filtering.

In image resolution down-sampling, the motion vector determination process is executed on lowered-resolution images. For example, input video may be down-sampled to 320×240 pixels/frame (¼ VGA) or even to 160×120 pixels/frame. Down-sampling to ¼ VGA or even lower resolution may achieve satisfactory results in terms of semantic meaning extraction and moving object detection while greatly reducing computational cost.

In block selection down-sampling, a block is selected for processing and then all of the selected block's immediately neighboring blocks are not processed, under the assumption that adjacent blocks have similar motion behavior.

Halfway termination involves calculating the compensation residual error of a block. If the block's accumulated distortion V produced by summing up the block's pixel differences is larger than the currently observed minimum distortion of already processed blocks, the calculation is terminated and the block is skipped. This also reduces cost by avoiding unnecessary calculations.

Affine Model Estimation

Figures 3, 5:
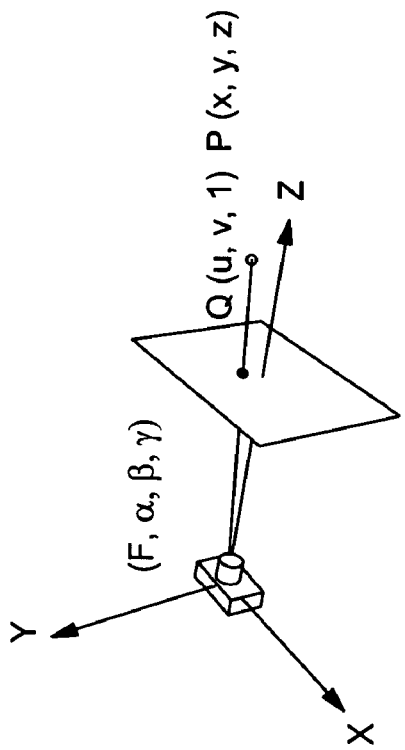
FIG. 3 illustrates a model of camera motion.
FIG. 5 shows affine model parameters for a sequence of video frames.

Camera motion C can be modeled as a function of four parameters, which are the camera's focal length F and rotation angles α, β, γ around the spatial coordinate orthogonal axes X, Y, Z, respectively. This can be denoted by C=C(F, α, β, γ) and is illustrated by FIG. 3. An arbitrary point P(x, y, z) in the space can be projected into a point Q(u, v) in the camera's view plane according to the following vector transformation:

$$\begin{pmatrix} u \\ v \end{pmatrix} = \begin{pmatrix} zoom & rotation & pan_x \\ rotation & zoom & pan_y \end{pmatrix} \cdot \begin{pmatrix} x \\ y \\ z \end{pmatrix} = A \cdot \begin{pmatrix} x \\ y \\ z \end{pmatrix} \quad \text{Eq. 3}$$

where zoom, rotation, $pan_x$, and $pan_y$ are four parameters decided by the camera motion C. The relationship between these parameters is described in J. Park et al., "Estimation of Camera Parameters from Image Sequence for Model-Based Video Coding", *IEEE Trans. on Circuits and Systems for Video Technology* vol. 4, pp. 288-295 (June 1994). Because there is no depth mapping information for a non-stereoscopic video signal, z=1.

Eq. 3 will be recognized as an affine transformation of the column vector (x, y, z). In general, an affine transformation is a linear transformation followed by a translation, e.g., A(x)=Mx+v, where A(x) is the transformation of the vector x, M is a matrix, and v is a vector. Compared to the typical affine model that would have six parameters in the matrix M, the model of Eq. 3 having four parameters may be better adapted for real-time semantic meaning analysis for a wide range of videos because it can be processed faster. It will be appreciated, of course, that simplification to four parameters is not required.

The affine model is estimated by using least squared error (LSE) regression according to the following matrix expression:

$$A = (X^T X)^{-1} X^T U, \quad \text{Eq. 4}$$

$$X = \begin{pmatrix} x_1 & x_2 & \ldots & x_N \\ y_1 & y_2 & \ldots & y_N \\ 1 & 1 & \ldots & 1 \end{pmatrix},$$

$$U = \begin{pmatrix} u_1 & u_2 & \ldots & u_N \\ v_1 & v_2 & \ldots & v_N \end{pmatrix}$$

where N is the number of samples, i.e., the selected feature blocks. Each sample includes an observation ($x_i$, $y_i$, 1) and an output ($u_i$, $v_i$) that are the coordinate values in the current and previous frames associated by the motion vector. Singular value decomposition may be employed to work out A. Aspects of affine model estimation by LSE regression are described in S. Boyd and L. Vandenberghe, *Convex Optimization*, Section 1.2, Cambridge University Press (2004).

By iterating the affine model, i.e., computing Eq. 4 using the result of a preceding computation(s), blocks whose residual errors are greater than a threshold can be excluded as outliers. This can also be considered a filtering of the motion vectors, just as edge-based feature detection is such a filtering. The threshold may be predefined and may be based on a function of the standard deviation of the error. The residual error R may be given by:

$$R_k(m, n) = E(P_k, A \cdot \tilde{P}_{k-1}) \Big|_{\substack{P_k \in B_k(m,n) \\ \tilde{P}_{k-1} \in B_{k-1}(m+v_x, n+v_y)}} \quad \text{Eq. 5}$$

where $P_k$, $\tilde{P}_{k-1}$ are the blocks associated by the motion vector ($v_x$, $v_y$). Even with a fixed threshold, new outliers may be identified in each iteration and excluded. Iteration of the model is terminated after a given number of iterations or when the affine parameter set becomes stable to a desired extent. To avoid possible divergence, a maximum number of iterations may be defined. In one embodiment, affine model estimation of most frames may be suitable after three or four iterations of the model are performed.

Figure 4:
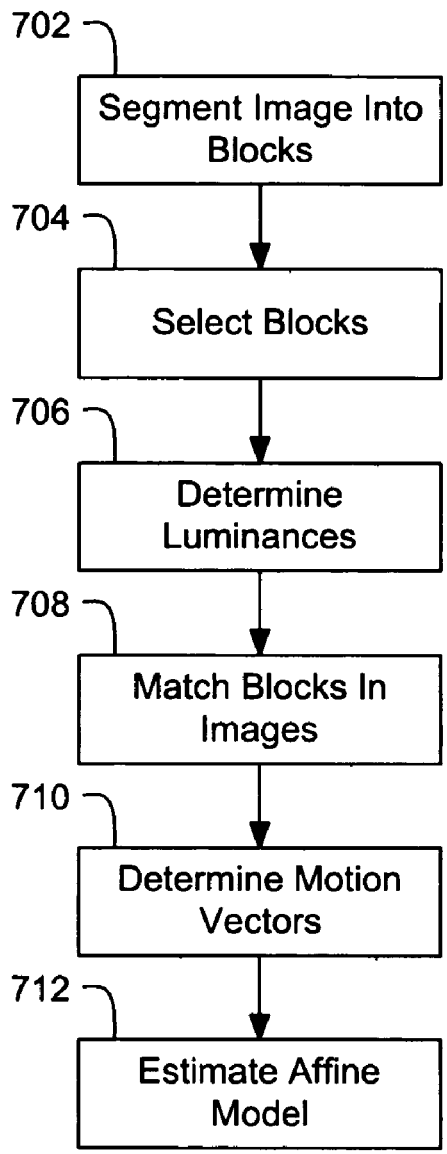
FIG. 4 is a flow chart of a method of estimating camera motion according to an embodiment of the present invention.

FIG. 4 is a flowchart of a method of estimating camera motion between two images as described above. In step 702, one of the images is segmented into one or more blocks, and in step 704, one or more of these blocks are selected for further processing. The selection is preferably carried out by finding blocks corresponding to one or more edges of an object or objects in the image. Luminance values corresponding to the selected block(s) are determined (step 706), and then the selected blocks are matched to corresponding blocks in the other one of the two images (step 708). Motion vectors are then determined for the matched blocks (step 710), and a set of camera motion parameters is determined from an estimated affine model of the camera's motion between the images (step 712).

Semantic Meaning Extraction

By affine model estimation, a set of motion parameters is determined for each frame. Each set represents the camera's motion at the moment that the particular frame was captured. It will be understood that there are different ways to define camera affine models, according to the interested freedom of the camera. In some cases, such as a digital camcorder or a surveillance video, the camera motion parameters can be recorded and known, and therefore there is no need to estimate the camera model. In any event, the sets are summarized to retrieve high-level semantic meaning.

FIG. 5 shows the affine model parameters zoom, rotation, $pan_X$, and $pan_Y$ for a sequence of a few frames. According to one embodiment of the present invention, semantic meaning is abstracted from the model parameters. For example, for the frames shown in FIG. 5, the camera motion may better be called "focus", e.g., concentration on a scene or object. Three techniques for semantic meaning abstraction, which are described in more detail below, are camera motion quantization, "sentence" generation, and "paragraph" generation. Depending on the level of abstraction desired, one or both of sentence and paragraph generations may be used.

Figure 6A:
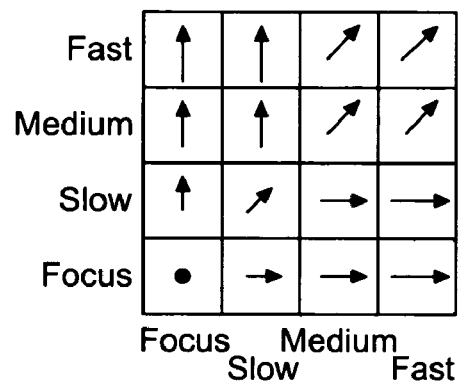
FIGS. 6A, 6B, 6C illustrate camera motion quantization into magnitude levels and directions with a hysteresis threshold.
Figure 6B:
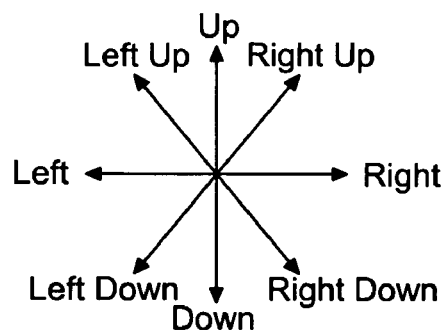
Figure 6C:
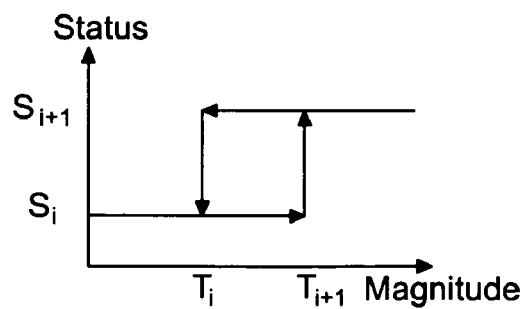

In camera motion quantization, a camera's motion, i.e., the affine model parameters, is first quantized into several magnitude levels and directions. FIG. 6A shows an exemplary schema for quantizing camera pan parameters. The other parameters, such as zoom and rotation, may be quantized similarly. In this schema, the pan magnitude along orthogonal axes, such as the X- and Y-axes, are classified into four regions: focus, slow, medium, and fast. The motion direction is quantized as shown in FIG. 6B. To be robust to vibrations of the camera and noise interferences, a hysteresis thresholding is preferably used to decide the transition, as illustrated in FIG. 6C. It will be appreciated that other quantizations may be used instead of those depicted in FIGS. 6A, 6B, 6C.

In "sentence" generation, sequences of images over small time spans, e.g., a few seconds, are naturally clustered together based on their affine model similarity, generating a reasonable number of semantic regions. In other words, adjacent frames sharing the same quantized camera motion parameters are merged into one longer time span, which is called a "sentence" in this application. This merging step summarizes one video clip into several sentences within which the camera motion is consistent, i.e., the affine model parameters are quantized into the same or similar level. At the same time, the average affine model is calculated for each sentence.

"Paragraph" generation builds on sentence generation, and thus a paragraph is an abstraction of a longer sequence of images, e.g., tens of seconds. As explained in more detail below, the histogram of durations of adjacent (successive) sentences is estimated. A further merging step is executed, summarizing the video into a number of semantic paragraphs decided by a sensitivity threshold. Sentences are merged into one or more paragraphs based on their similarities, which may be measured according to distance metrics between affine model parameters. Suitable distance metrics are Euclidean distances between parameters. The semantic meaning of each paragraph is re-evaluated using the weighted affine model.

Figure 7:
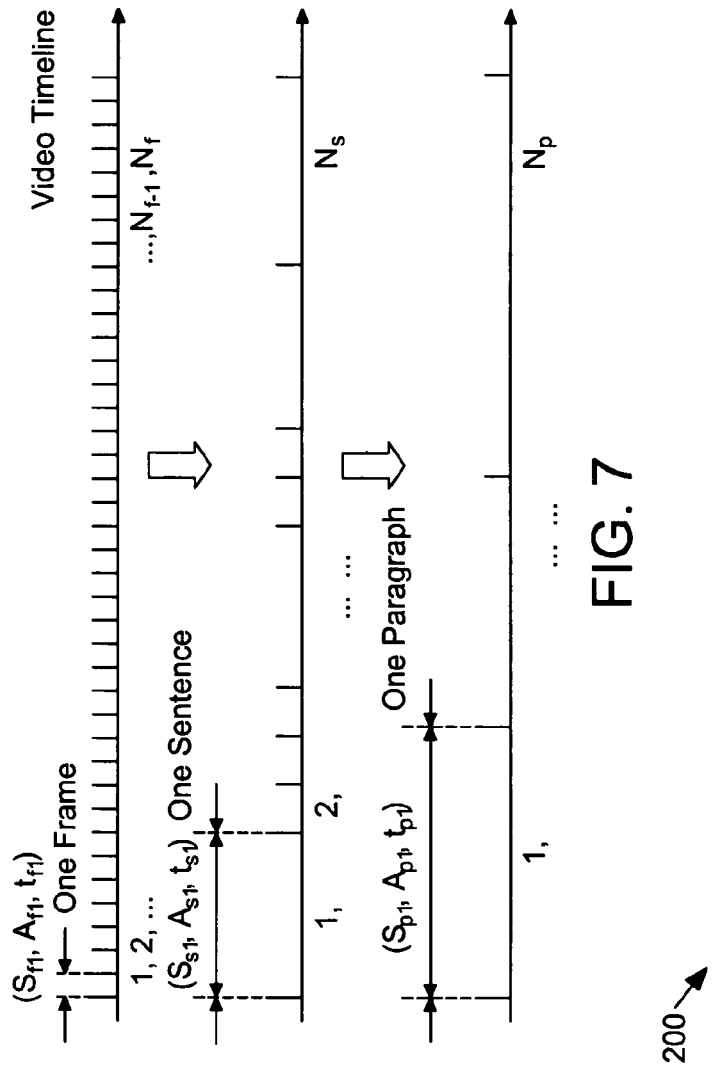
FIG. 7 illustrates an embodiment of sentence and paragraph generation.

The process of affine model estimation, parameter quantization, sentence generation, and paragraph generation is depicted in FIG. 7, which indicates the succession of frames of a video clip by tick marks on a video timeline. Let there be a number $N_f$ of frames in the clip, and let each frame i, where i=1, 2, ..., $N_{f-1}$, $N_f$ have a duration $t_{fi}$, an estimated affine model $A_{fi}$, and a quantized camera motion $S_{fi}$. Sentence generation produces a number $N_S$ of sentences, and in FIG. 7, each sentence j is identified by a respective quantized camera motion $S_{Sj}$, an affine model $A_{Sj}$, and a duration $t_{Sj}$, where:

$$A_{sj} = \frac{\sum_i A_{fi} \cdot \{1 | S_{fi} = S_{f(i+1)}\}}{\sum_i \{1 | S_{fi} = S_{f(i+1)}\}},$$ Eq. 6

$$t_{sj} = \sum_i t_{fi} \cdot \{1 | S_{fi} = S_{f(i+1)}\}, \quad j = 1, 2, \ldots, N_s$$

After sentences are generated, a histogram of the durations $t_{Sj}$ is generated, the distribution of durations $t_{Sj}$ is evaluated. A duration toleration threshold $T_d$ is used to merge sentences into a number N of paragraphs. Those sentences having durations larger than $T_d$ act as anchor sentences $S_A$, and the other sentences are merged into these anchors based on distance measurements, where the distances may be Euclidean distances, between the affine models.

The semantic meaning of camera motion of each paragraph k is evaluated from:

$$A_{pk} = \frac{\sum_{t_{s_a,k} < t_{s_j} < t_{s_a,k+1}} A_{s_j} \cdot t_{s_j} \cdot M(A_{s_j}, A_{s_a,k})}{\sum_j t_{s_j} \cdot M(A_{s_j}, A_{s_a,k})}$$ Eq. 7

$k = 1, 2, \ldots, N_p$ $M(A_s, A_{s_a,k}) = \{1 | D(A_s, A_{s_a,k+1}) > D(A_s, A_{s_a,k})\}$ $S_{pk} = Q(A_{pk})$ $t_{pk} = \sum_j t_{s_j} \cdot M(A_{s_j}, A_{s_a,k})$ where Q(A) is the quantization mapping from affine model parameters to semantic camera motion, and D is the selected distance. In this process, the threshold $T_d$ sets the sensitivity of detecting changes in semantic camera motion.

Figure 8:
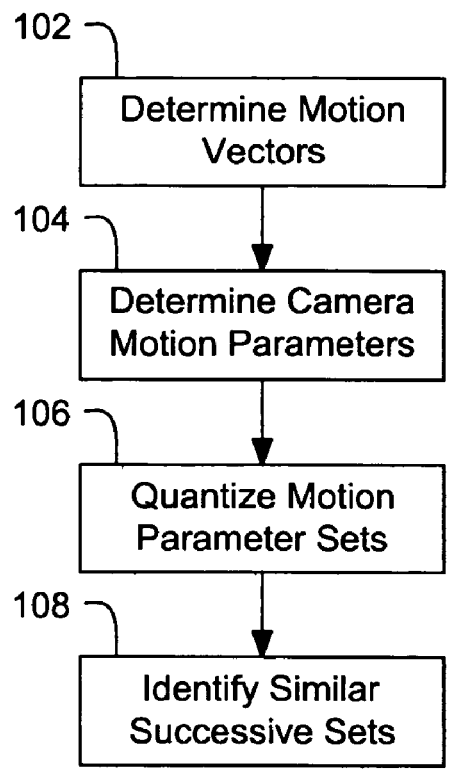
FIG. 8 is a flow chart of a method of transforming camera motion parameters into semantic meanings according to an embodiment of the present invention.

FIG. 8 is a flowchart of a method of transforming camera motion parameters into semantic meanings as described above. In step 102, motion vectors are determined or provided, and then in step 104, camera motion parameters are determined from the motion vectors. The sets of motion parameters are quantized (step 106), and similarly quantized sets are identified as sentences and, optionally, paragraphs (step 108).

Object Detection and Tracking

In this application, a moving object in a video sequence is generally defined as a region having degrees of motion and semantic meaning that are of interest. The motion of a moving object is advantageously tracked by finding its location and size in each of a succession of frames of the video sequence. In contrast to prior approaches to moving object detection and tracking that often involve some simplification, such as limitation to tracking faces or a predetermined model (e.g., a three-dimensional model of the object of interest, such as a car), moving object detection according to the present invention is based only on motion information; no a priori knowledge is needed.

Object Detection

According to the present invention, moving object detection is based on assumptions that foreground motion behavior is different from background motion behavior and that the region (i.e., foreground or background) of a moving object is exposed as outliers when a motion compensation residual is estimated according to:

$$R_k(m,n) = \|B_k(m,n) - A \cdot B_{k-1}(m+v_x, n+v_y)\|$$ Eq. 8 where $R_k$(m, n) is the residual error of the block starting from a location (m, n) in the k-th frame; $B_k$ and $B_{k-1}$ are the blocks associated by the motion vector $(v_x, v_y)$; and A is the affine model. It will be noted that real-time estimation of the residual $R_k$ may require reducing the computational cost of the estimation. One way to reduce cost is to carry out the estimation of Eq. 8 on only the region or regions identified as an outlier or outliers during the affine model estimation. Cost is reduced because the other regions have already satisfied the LSE criterion during the iterations, i.e., for blocks following the motion parameters defined by the affine model, the residual error will be small.

The assumption that the region of a moving object is exposed as outliers may not be valid for real video sequences because outliers can also result from noise in background motion estimation. Therefore, an important task for motion-based object detection is to distinguish an actual object from background noise in the outliers. Hence, according to the present invention actual objects are distinguished from background noise by assuming that objects of interest have moderate sizes and tend to lie in the centers of images. The moderate-size assumption results in exposure of enough residual errors and delivers considerable semantic meaning. The central-biassed assumption reflects an understanding that our interest in an object wanes as its location moves away from the center. It will be appreciated that these assumptions are desirable to the extent that they facilitate real-time operation with commonly available processors, but they are not required. Based on these assumptions, residual errors are filtered by applying a set of weight parameters as described in more detail below.

Figure 9:
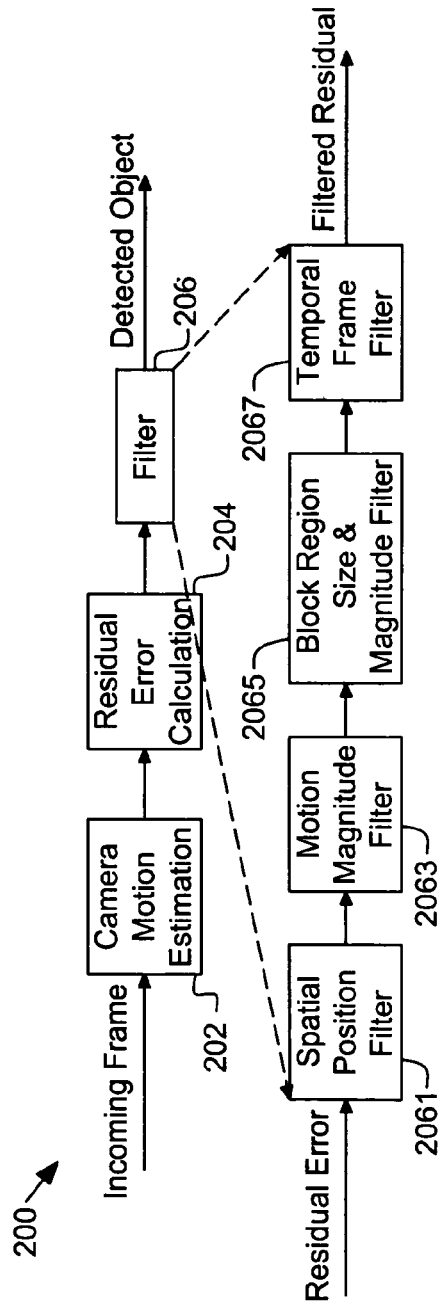
FIG. 9 is a block diagram of an embodiment of an apparatus for detecting an object.

FIG. 9 is a block diagram of an apparatus 200 for detecting objects in input video sequences. It will be understood that the apparatus may be implemented as logic configured to perform the operations described or as one or more programmable processors or as a combination of these, among other things.

The apparatus 200 includes a device 202 that estimates camera motion, generating motion vectors and affine model estimates as described above from pairs of successive images in an incoming sequence. The model parameters are provided to a device 204 that determines residual errors $R_k$ according to Eq. 8. The residual errors, i.e., the error image, are provided to a filter 206 that produces an indication of a detected object in the filtered residual errors. The filter 206 advantageously includes one or more of a spatial position filter 2061, a motion magnitude filter 2063, a block region size and magnitude filter 2065, and a temporal frame filter 2067, which are described in more detail below.

The spatial position filter 2061 assigns higher weights to blocks located near the central region of a frame. An exemplary filter function is an exponential, such as:

$$f_s(P) = \frac{1}{1-\varepsilon} \cdot (1 - e^{-\lambda(M-\|P\|)}), \lambda = \frac{-\log \varepsilon}{M} \quad \text{Eq. 9}$$

where $f_s(P)$ is the output of the filter; P is the block being filtered; $\|P\|$ is the distance between the block P and the center of the image; M is a predefined value where the weight is zero; and $\varepsilon$ and $\lambda$ are parameters used to normalize the filter function and make it more like a typical probability function.

The motion magnitude filter 2063 is useful because the larger the magnitude of a camera's motion, the more the outliers tend to be affected by background noise. For example, consider the panning magnitude. An exemplary motion magnitude filter function is Gaussian-based, such as:

$$f_m(\|P_M\|) = e^{\frac{-\|P_M\|^2}{2\sigma^2}} \quad \text{Eq. 10}$$

$$\|P_M\| = \sqrt{pan_x^2 + pan_y^2}$$

where $f_m(\|PM\|)$ is the output of the filter; $\|P_M\|$ is the block being filtered; $\|P_M\|$ is the panning magnitude; and the deviation a is set to be on the boundary of the searching range.

The difference between these spatial position and motion magnitude filters is in their behaviors on a frame boundary. The spatial position filter assigns zero weight on the frame boundary, and the motion magnitude filter gives a non-zero weight on the search boundary. These two filters may be implemented by look-up tables to reduce the computational cost of calculating the weights.

After spatial position and motion magnitude filtering, the adjusted residual error $R_k$ is given by:

$$\tilde{R}_k = f_s(P) \cdot f_m(\|PM\|) \cdot R_k \quad \text{Eq. 11}$$

The following two filters use this adjusted residual.

To implement the block region size and magnitude filter 2065, outlier blocks are first clustered into regions based on their connectivity. This can be done with a fast flooding algorithm as depicted by FIG. 10A. In FIG. 10A, if the block marked with the star is the starting seed of the connectivity search, all of its immediately neighboring blocks are checked in a predefined order, which is indicated by the numbers 0-7 in the figure. Each checked block is suitably marked correspondingly so that it is not checked again in a later search. If an outlier block is detected among the neighboring blocks, it is flagged (in the figure, the diamond mark in block 4 indicates an outlier), the seed is moved into the flagged block, and the search continues in the immediately neighboring blocks in the same predefined searching order. It will be noted that all pre-checked blocks are skipped, so that in this example, the blocks numbered 2-6 are checked.

The filter 2065 repeats this procedure recursively, which is an efficient method for connecting all of the outlier blocks together. This procedure can be considered as a simplified discrete version of the natural clustering algorithm based on sample distance that is described in P. O. Duda, P. E. Hart, and D. G. Stork, *Pattern Classification*, Wiley, New York (2001).

Once all of the outlier blocks are clustered into specific regions, each region is effectively denoted by a bounding box (indicated in FIG. 10B) and a representative residual magnitude, which may be defined as the maximum residual error among all the blocks in the region. The bounding box indicates a detected object. In one embodiment, any region having a size less than a first threshold or a magnitude less than a second threshold is filtered out. If there is at least one region having a size larger than a third threshold, the frame is skipped for moving object detection because it can be assumed that the affine model in this frame is not reliable.

The temporal frame filter 2067 may be useful because not every frame is suitable for detecting a moving object. For example, the residual errors of the blocks of a moving object may be overwhelmed by background noise, making it hard to detect the object. Residual errors from background blocks may be large due to complex textures and fast camera motion, among other reasons. For this purpose, firstly all or substantially all of the blocks that are connected with each other are combined into a large region. The temporal frame filter 2067 operates to select frames having one dominant block region as the candidate to detect objects. Thus, only those frames having a block region of dominant residual error and moderate size are kept. Such frames include detected objects. Other frames can be omitted from further processing.

Figure 11:
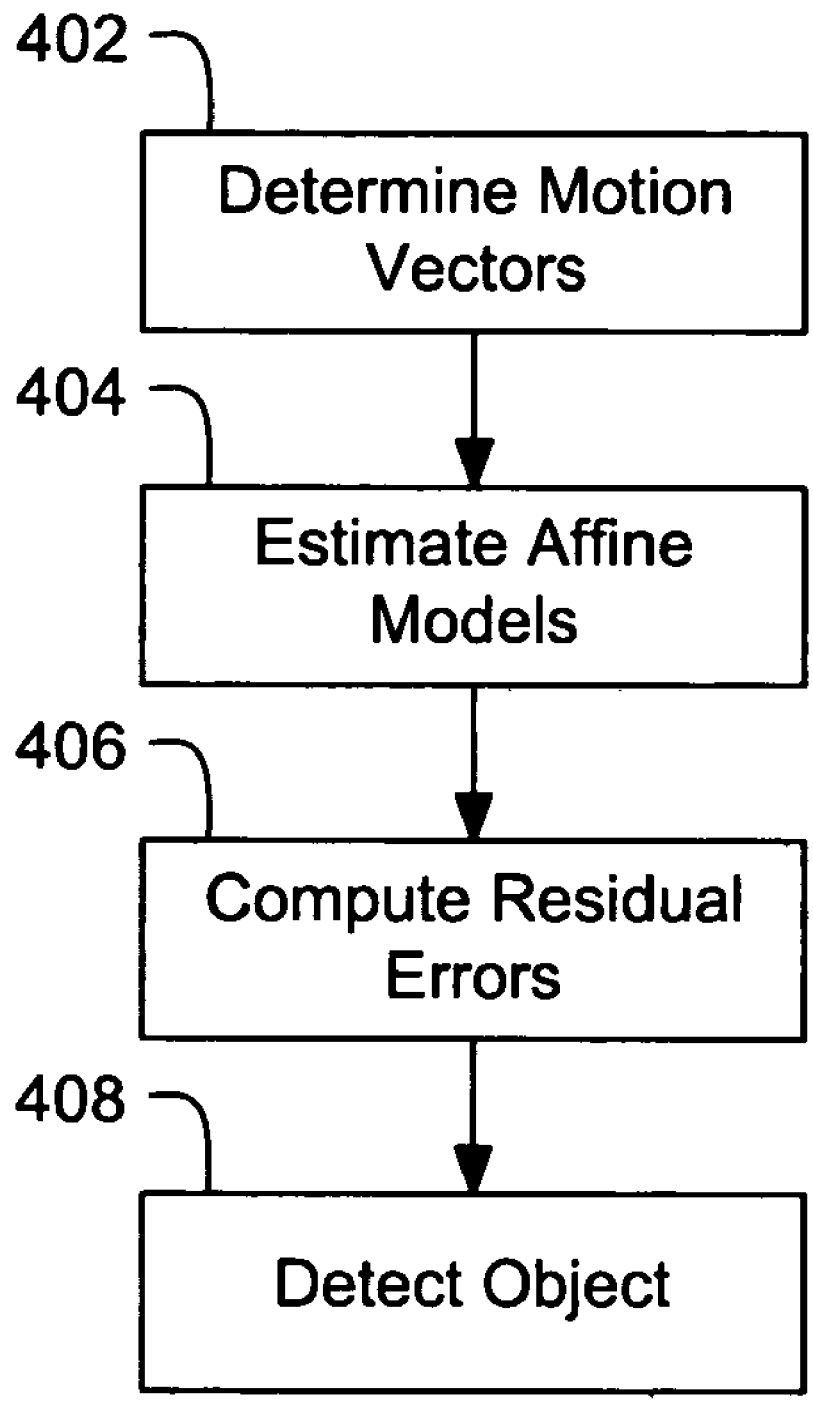
FIG. 11 is a flow chart of a method of object detection according to an embodiment of the present invention.

FIG. 11 is a flowchart of a method of object detection that is in accordance with the present invention as described above. In step 402, motion vectors are determined from pairs of successive images, and these motion vectors are used for estimating affine models in step 404. In step 406, residual errors are computed for respective blocks of pixels in the pairs of images based on the motion vectors and affine models. In step 408, an object is detected based on the residual errors.

Object Tracking

Once a moving object is detected, its position and size (denoted by a bounding box of pixels like that depicted in FIG. 10B) can be forwarded to a moving-object tracker that is described in more detail below. According to the moving-object tracking process of the present invention the bounding box only needs to be considered instead of a more precise contour of the moving object. The bounding box delivers enough semantic meaning, and working out a precise contour of an object requires more complex computations that cannot easily be done in real-time by current processors that are widely available.

For example, a moving object may be detected in the beginning frames of a video clip, and then the object may be tracked through subsequent frames in the video clip. For another example, a moving object may be detected periodically (e.g., once every 100 frames, or once every two seconds, etc.), and then the target model of the moving object may be updated or a more salient moving object may be found that replaces the current target. For yet another example, a moving object may be detected when certain criteria are satisfied, e.g., when the current moving object moves out of the frame.

A detected moving object can advantageously be represented by its quantized color histogram, which may be formed in a convenient color space, such as an R-G-B (red-green-blue) space, with $N_R \times N_G \times N_B$ bins, where $N_R$, $N_G$, $N_B$ are the numbers of bins for the R, G, B color channels, respectively. It will be appreciated that other color spaces, such as the YUV space and the magenta-yellow-cyan space, may be used instead of the R-G-B space. An advantage of a color histogram is its robustness when the object is undergoing complex motion such as rotation, scaling, and even non-rigid warping.

In another embodiment of the present invention, a spatially enhanced color histogram may be used to represent a detected moving object. A bounding box 500 is divided into a marginal part 502 and a central part 504, as depicted by FIG. 12. In the figure, the height and width (in pixels) of the central part 504 are one-half of height H and width W of the marginal part 502. Each part has its own histogram statistics, and the overall histogram is a concatenation of these two regional histograms. It will be understood that other ways of partitioning the color histogram with spatial information can be used.

The color histogram is preferably normalized to a probability shape as follows:

$$q_u = \frac{\sum_{i=1}^{N} \delta[b(x_i) - u]}{N} \quad \text{Eq. 12}$$

where $\delta$ is the Kronecker delta function; u is the histogram index; q is the histogram probability; $b(x_i)$ is a function mapping a pixel $x_i$ located in the moving object region into one entrance of the histogram bins; and N is the number of pixels in the object region. Here, the "entrance" means the index of the bin. For example, if there are 100 histogram bins, the numbers 1-100 are the entrances (indexes) that locate specific color bins.

In one embodiment, instead of directly using a color histogram, a kernel function is applied and smaller weights are assigned to pixels farther away from the center. Such kernel-based tracking (KBT) is described in D. Comaniciu, V. Ramesh, P. Meer, "Real-Time Tracking of Non-Rigid Objects Using Mean Shift", *IEEE Conf Computer Vision and Pattern Recognition* (CVPR '00), Vol. 2, pp. 142-149, Hilton Head Island, S.C. (2000); and D. Comaniciu, V. Ramesh, P. Meer, "Kernel-Based Object Tracking", *IEEE Trans. Pattern Analysis Machine Intell.*, Vol. 25, No. 5 (2003). The principle of kernel selection is to select the ones with a convex and monotonic decreasing kernel profile. The Epanechnikov kernel function described in the above-cited papers by Comaniciu et al may yield significant computing simplification.

With a kernel function, both the target model and the target candidate are expressed as weighted color histogram probability density functions (PDFs). Next, the target candidate is found that has the smallest distance from the target model. In particular, given a target model and a target candidate, the similarity metric is, in one embodiment, the Bhattacharyya coefficient, which is a divergence type measure which has a straightforward geometric interpretation: it is the cosine of the angle between m-dimensional unit vectors. The distance between a target model and a candidate is based on the Bhattacharyya coefficient, and the object-tracking task of finding a target candidate that minimizes the distance is equivalent to finding a candidate that maximizes the Bhattacharyya coefficient.

For distance minimization, a gradient-based mean shift iteration described in the papers by Comaniciu cited above can be used. A combination of the diamond search (DS) and three-step search (TSS) algorithms described above may be used. In general, in a first step, both of the DS and TSS algorithms are applied and the one that succeeds (in terms of distance minimization) keeps processing and the other one quits. In a second step, the remaining algorithm continues searching using its own rule until the minimum distance is found.

In tracking a moving object, the target model is obtained from the object detected in the object-detection stage, i.e., the output of the filter 206. The target model is optionally updated with the tracked object in the object-tracking stage. This can be done periodically or whenever it is determined that there is a significant difference between the target model and the selected target candidate. The model could also be updated with or without memory.

Exemplary Architecture

Figure 13:
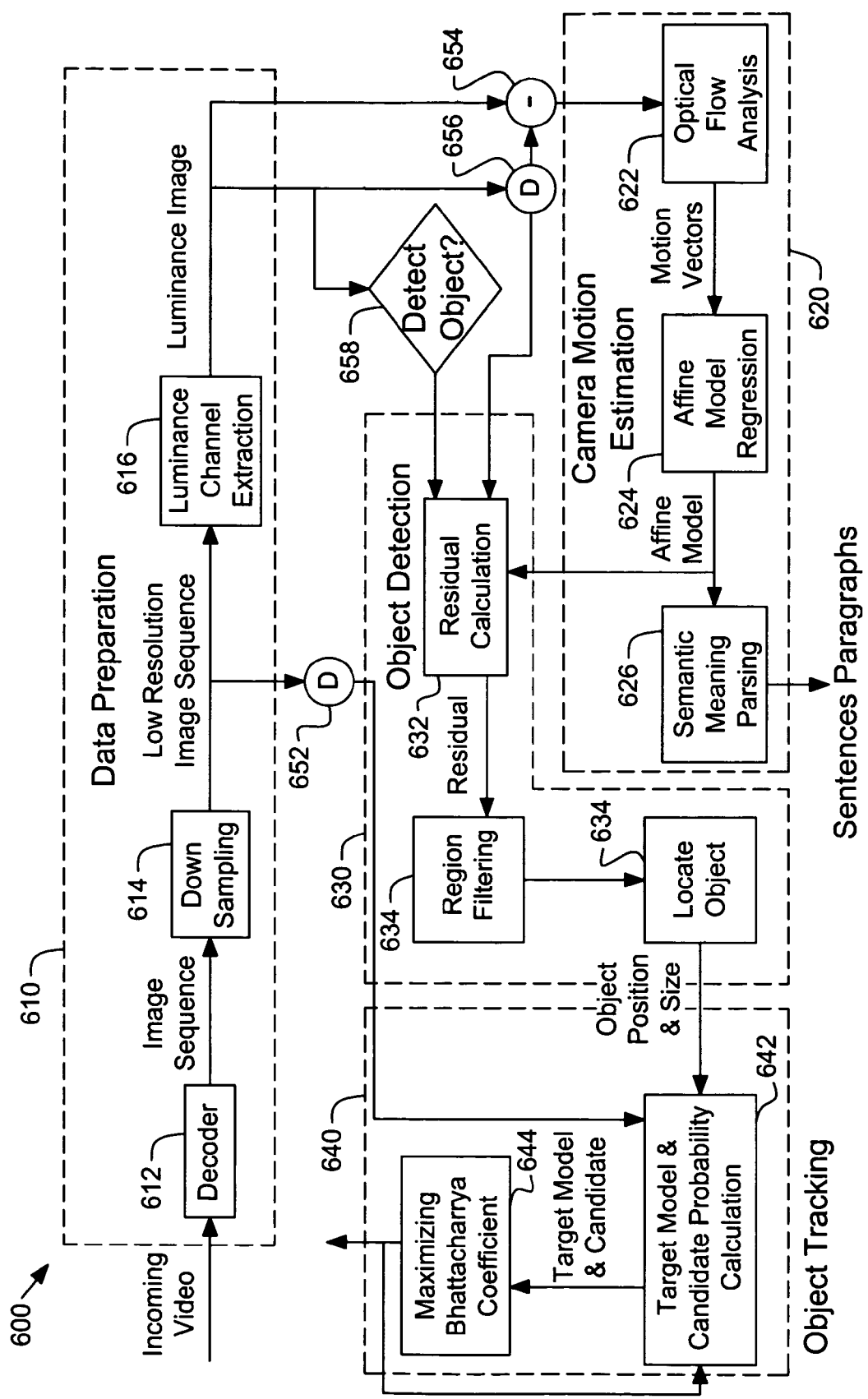
FIG. 13 is a block diagram of an apparatus for video motion understanding according to an embodiment of the present invention.

One example of an overall system architecture for real-time video motion understanding is illustrated in FIG. 13. The system 600 includes a data preparation device 610, a camera motion estimator 620, a moving object detector 630, and a moving object tracker 640. As noted above in connection with FIG. 9, the system 600 may be realized by suitably configured logic and/or a suitably programmed processor, among other things.

The data preparation device 610 may include a decoder 612 that decodes an incoming video signal if necessary and produces an image sequence. A down-sampler 614 may receive the image sequence and produce a sequence of lower-resolution images, which may be provided to the object tracker 640 through a suitable delay device 652. The data preparation device may further include a device 616 that extracts luminance information from the down-sampled image sequence. Decoding, down-sampling, and luminance extraction are not always necessary for reasons that are discussed above.

The camera motion estimator 620 may include an optical flow analyzer 622 that uses luminance images, either from a data preparation device 610 or another source, for optical flow analysis. The analyzer 622 preferably includes a suitable memory buffer so that the analysis can be carried out on a current image and a buffered previous image from the image sequence as described above. Moreover, the analyzer 622 advantageously operates on difference images that can be generated from pairs of successive images by a subtractor 654 and a suitable delay device 656. The analyzer 622 generates motion vectors from the image sequence or a difference image sequence, and the motion vectors are provided to an affine model estimator 624. The affine model is estimated based on the motion vectors preferably using LSE as described above. Estimated affine models may then be provided to a semantic meaning parser 626, if desired, that generates sentences and, optionally, paragraphs based on combinations of the affine model estimates as described above.

Affine model estimates are provided to a residual error calculator 632 in the object detector 630 that receives images that are suitably delayed by the delay device 656. Whether objects are detected can be controlled by a switch or other suitable decision device 658. The residual errors of outliers are determined using the affine model estimates and the outliers are selected for detecting moving objects as described above. The selected pixels or blocks are processed by a filter 634 that operates as the filter 106 described above to locate the region of an object. This information is passed to an object locator 636, which advantageously delivers the object's position and size as a bounding box or equivalent information. The bounding box or equivalent that identifies an object's position and size are provided to the object tracker 640.

The tracker 640 includes a target model and probability calculator 642 and a coefficient maximizer 644 that determine a target model and the target candidate PDFs, and the Bhattacharyya coefficient is maximized as described above to minimize distance. Finally, an indication of the tracked moving object is output, completing the processing of the current frame. The nature of the indication of the tracked moving object may advantageously be the location of the object boundary region (e.g., for a bounding box as in FIG. 10B, the left-side, top, right-side, and bottom). The system 600 has been implemented with a laptop computer having a 1.0 GHz processor and 256 Mbytes of random access memory. In an exemplary use of the system, the incoming video signal was a 10-second-long video sequence of 30 frames per second, with each frame including 352×240 pixels encoded according to the MPEG-1 format. The video frames were down-sampled to one-quarter size, i.e., 176×120 Accordingly, the system 600 included an MPEG-1 decoder 612, which used 2.016 seconds to decode the 10-second input sequence, which was a shot of one player during a tennis match. All camera motion estimations were completed in 1.089 seconds, and object detection and tracking during the whole sequence was completed in 1.151 seconds. Thus, the total time, or cost, for video motion analysis (2.24 seconds) is comparable to the decoding cost (2.016 seconds) in this example, and all processing, including decoding, camera motion analysis, and object motion analysis (detection and tracking), was finished faster than real time (10 seconds). As noted above, using an image sequence instead of an encoded video clip may save the decoding cost, and can double the speed of the whole process in this example. Furthermore, if the image sequence is provided in Y-U-V format, the cost of color-space transformation could also be saved.

In another exemplary use of the system 600 implemented on the above-described laptop computer, a 26-second video of a wharf in San Francisco was used as the incoming video signal. The video was encoded in the MJPEG format and included 15 frames per second, with each frame including 640×480 pixels. As noted above, the input frames were down-sampled half by half until the width was less than or equal to 200 pixels, and in this example, the final image size used was 160×120. Accordingly, the system 600 included an MJPEG decoder 612, which needed 9.263 seconds to decode the 26-second input sequence. All camera motion estimations were completed in 2.373 seconds, and object detection and tracking during the whole sequence was completed in 1.323 seconds. Thus, the total cost for video motion analysis (3.696 seconds) was considerably less than the decoding cost (9.263 seconds) in this example, and all processing, including decoding, camera motion analysis, and object motion analysis (detection and tracking), was finished faster than real time (26 seconds).

From these examples, it can be seen that use of the system 600 should be practical for typical types of videos, including action videos, commercial videos, etc. When the image size is larger, the cost of decoding and down-sampling can dominate the total computation cost, but again, this cost can be saved if a luminance image sequence is provided as the incoming signal.

The present invention can be used for finding particular frames of video sequences, for example for video printing. In addition, the invention can be applied to automatic video editing and intelligent video browsing, enabling a better understanding of a video's content and a consequent more accurate grasp of the highlights of the video. According to moving object detection and tracking of the present invention, those video frames with a moving object of the appropriate size and position can be detected, and undesired frames can be ignored or eliminated.

It will be appreciated that procedures described above are carried out repetitively as necessary. To facilitate understanding, many aspects of the present invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, the present invention can additionally be considered to be embodied within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electro-magnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method of estimating camera motion between a pair of successive images, comprising:
   determining motion vectors from the pair of successive images, wherein the determining comprises
      segmenting one of the pair of successive images into a plurality of blocks of pixels,
      selecting for motion vector determination only ones of the blocks having respective levels of feature content that satisfy a criteria,
      determining luminance values corresponding to respective ones of the selected blocks,
      matching the selected blocks to blocks of pixels in the other of the pair of successive images based on the luminance values, and
      determining motion vectors associated with the matched blocks in the pair of successive images; and
   estimating an affine model of the camera motion based on the motion vectors, wherein the estimated affine model determines a set of camera motion parameters.

2. The method of claim 1, wherein each of the blocks is an 8×8 array of pixels.

3. The method of claim 1, wherein the estimating comprises determining motion vectors by minimizing a distortion value within a search range.

4. The method of claim 3, wherein the estimating comprises minimizing the distortion value based on an exhaustive search within the search range.

5. The method of claim 3, wherein the estimating comprises minimizing the distortion value based on a three-step search within the search range.

6. The method of claim 1, further comprising filtering the motion vectors to remove outliers associated with motion prediction errors that meet a threshold predicate.

7. The method of claim 6, wherein the filtering comprises determining a consensus of a set of the motion vectors, comparing a motion vector to the consensus, and removing the motion vector if it differs substantially from the consensus.

8. The method of claim 1, wherein the selecting comprises selecting ones of the blocks based on their respective levels of edge content.

9. The method of claim 8, wherein the selecting comprises detecting the respective levels of edge content based on application of a Sobel operator to blocks of pixel luminance values.

10. The method of claim 1, further comprising down-sampling the pair of successive images, wherein the motion vectors are determined from the down-sampled images.

11. The method of claim 1, further comprising iterating the estimated affine model to remove outliers.

12. A method of estimating camera motion between a pair of successive images, comprising the steps of:
   determining motion vectors from the pair of successive images by the steps of:
      segmenting one of the pair of successive images into a plurality of blocks of pixels;
      selecting blocks corresponding to at least one feature in the image;
      determining luminance values corresponding to respective selected blocks;
      matching the selected blocks to blocks of pixels in the other of the pair of successive images based on the luminance values; and
      determining motion vectors associated with matched blocks in the pair of successive images; and
   estimating an affine model of the camera motion based on the motion vectors, wherein the estimated affine model determines a set of camera motion parameters, wherein the affine model is based on the camera's focal length and rotation angles around three orthogonal axes.

13. The method of claim 12, wherein the estimating comprises estimating the affine model based on a least squared error regression.

14. A method of transforming camera motion parameters into semantic meanings, comprising:
   determining motion vectors from pairs of successive images;
   determining respective sets of camera motion parameters by estimating affine models based on the motion vectors; and
   generating semantic meanings from the sets of camera motion parameters, wherein the generating comprises
      quantizing the sets of camera motion parameters into a plurality of quantized magnitude classes and quantized direction classes, and
      producing at least one sentence from a sequence of the images, wherein the producing comprises merging into the sentence successive ones of the images having respective sets of camera motion parameters that are quantized into substantially similar magnitude and direction classes.

15. The method of claim 14, wherein the producing comprises computing an average affine model for a sentence.

16. The method of claim 14, further comprising the step of generating at least one paragraph from the quantized sets by identifying successive sentences that indicate quantizations that are substantially the same.

17. The method of claim 16, wherein the producing comprises generating a histogram of durations of successive sentences and combining sentences based on the histogram.

18. The method of claim 17, wherein the combining comprises comparing sentence durations to a threshold, determining anchor sentences based on the comparisons, and merging sentences into the anchor sentences based on distance measurements.

19. A method of detecting an object in images captured by a camera, comprising the steps of:
   determining motion vectors from pairs of successive images;
   estimating affine models based on the motion vectors;
   computing motion compensation residual errors for respective blocks of pixels in the pairs of successive images from the motion vectors and the affine model estimates;
   filtering the motion compensation residual errors by applying a set of weight values, wherein the filtering step includes generating adjusted residual errors by
      spatial position filtering by assigning larger weight values to blocks located near a central portion of an image and zero weight values to blocks on an image boundary, and motion magnitude filtering by assigning larger weight values to blocks located near the central portion of the image and non-zero weight values to blocks on the image boundary; and detecting an object based on the residual errors.

20. The method of claim 19, wherein the spatial position filtering is a based on an exponential function.

21. The method of claim 19, wherein the motion magnitude filtering is based on a Gaussian function.

22. The method of claim 19, wherein the spatial position filtering and the motion magnitude filtering are implemented as look-up tables.

23. The method of claim 19, wherein the filtering step further comprises the step of size and magnitude filtering the adjusted residual errors by clustering outlier blocks into regions based on connectivity, thereby generating bounding boxes and representative residual error magnitudes corresponding to respective regions.

24. A method of detecting an object in images captured by a camera, comprising the steps of:
    determining motion vectors from pairs of successive images;
    estimating affine models based on the motion vectors;
    computing residual errors for respective blocks of pixels in the pairs of successive images from the motion vectors and the affine model estimates;
    detecting an object based on the residual errors;
    tracking a detected object by representing the detected object as a quantized color histogram, normalizing the quantized color histogram to a probability shape, and weighting the normalized quantized color histogram, wherein smaller weight values are assigned to pixels farther from the center of the detected object.

25. The method of claim 24, wherein a quantized color histogram is spatially enhanced by partitioning the quantized color histogram into a central part and a marginal part.

26. The method of claim 24, wherein the normalized quantized color histogram is weighted based on a kernel function.

27. An apparatus for video motion understanding, comprising:
    a data preparation device, comprising
        a decoder that decodes an incoming video signal and produces an image sequence,
        a down-sampler that receives the image sequence and produces a sequence of lower-resolution images, and
        a device that extracts luminance information from the down-sampled image sequence;
    a camera motion estimator that includes an optical flow analyzer that uses the extracted luminance information for optical flow analysis to generate motion vectors from blocks of pixels in pairs of successive images, and an affine model estimator that generates respective sets of camera motion parameters of affine models of camera motion based on the motion vectors; and
    an object detector that determines motion compensation residual errors for ones of the blocks based on the sets of camera motion parameters, selects ones of the blocks based on the determined motion compensation residual errors, and filters the selected blocks, wherein the object detector generates a bounding box that identifies a size and position of an object in the image.

28. An apparatus for video motion understanding, comprising:
    a camera motion estimator that includes an optical flow analyzer that uses luminance images for optical flow analysis to generate motion vectors from blocks of pixels in pairs of successive images, and an affine model estimator that respective sets of camera motion parameters of affine models of camera motion based on the motion vectors; and
    an object detector that determines motion compensation residual errors for ones of the blocks based on the affine models of camera motion, selects ones of the blocks based on the determined motion compensation residual errors, and filters the selected blocks, wherein the object detector generates a bounding box that identifies a size and position of an object in the image; and
    a semantic meaning parser that generates semantic meanings from the affine models of camera motion, wherein in generating the semantic meanings the semantic meaning parser performs operations comprising
        quantizing the sets of camera motion parameters into a plurality of quantized magnitude classes and quantized direction classes, and
        producing at least one sentence from a sequence of the images, wherein the producing comprises merging into the sentence successive ones of the images having respective sets of camera motion parameters that are quantized into substantially similar magnitude and direction classes.

29. An apparatus for video motion understanding, comprising:
    a camera motion estimator that includes an optical flow analyzer that uses luminance images for optical flow analysis to generate motion vectors from blocks of pixels in pairs of successive images, and an affine model estimator that generates affine model estimates based on the motion vectors;
    an object detector that determines residual errors of blocks based on the affine model estimates, selects blocks based on the residual errors, and filters selected blocks, wherein the object detector generates a bounding box that identifies a size and position of an object;
    a semantic meaning parser that generates at least one sentence based on combinations of the affine model estimates; and
    a moving object tracker that includes a target model and probability calculator and a coefficient maximizer that determine target models and target candidate probability density functions based on the bounding box and generate an indication of a tracked moving object.

* * * * *

UNITED STATES PATENT AND TRADEMARK OFFICE
CERTIFICATE OF CORRECTION

PATENT NO. : 7,447,337 B2  Page 1 of 1
APPLICATION NO. : 10/972003
DATED : November 4, 2008
INVENTOR(S) : Tong Zhang et al.

It is certified that error appears in the above-identified patent and that said Letters Patent is hereby corrected as shown below:

In column 9, line 57, delete "N" and insert -- $N_P$ --, therefor.

In column 11, line 65, delete "$f_m(\|PM\|)$" and insert -- $f_m(\|P_M\|)$ --, therefor.

In column 11, line 65, delete "$\|P_M\|$" and insert -- P --, therefor.

In column 11, line 67, before "is set" delete "a" and insert -- σ --, therefor.

In column 12, line 11, delete "$(\|PM\|)$" and insert -- $(\|P_M\|)$ --, therefor.

Signed and Sealed this

Seventh Day of April, 2009

JOHN DOLL
*Acting Director of the United States Patent and Trademark Office*